March 9, 1926.
S. BERINGER
AUTO ATTACHMENT
Filed Dec. 11, 1924
1,576,265
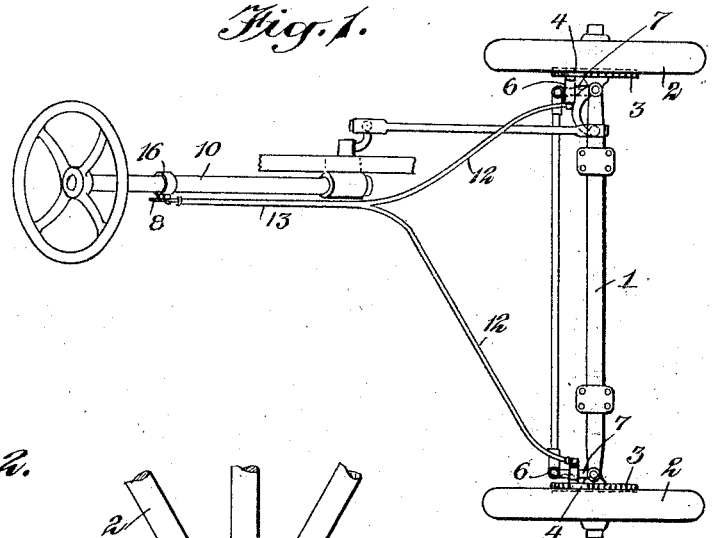
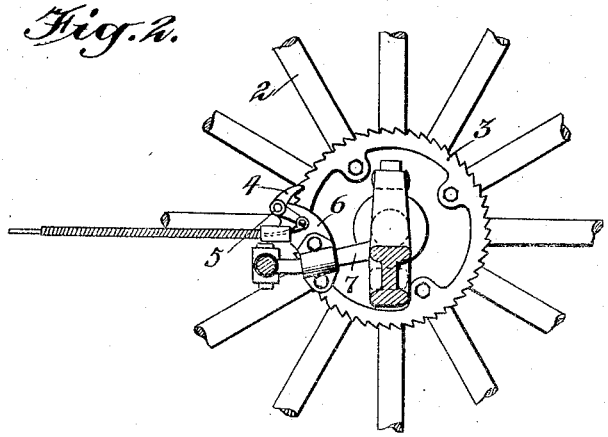
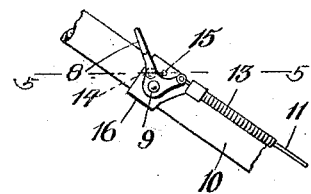
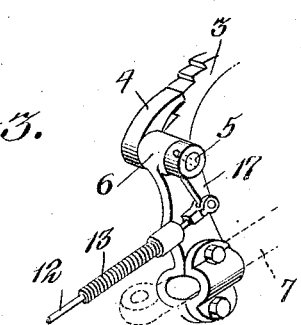
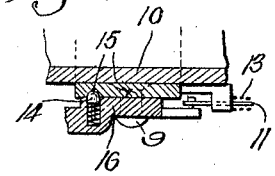
WITNESSES
INVENTOR
*Sol Beringer*
BY
ATTORNEYS Patented Mar. 9, 1926.

1,576,265

UNITED STATES PATENT OFFICE.

SOL BERINGER, OF BRONXVILLE, NEW YORK.

AUTO ATTACHMENT.

Application filed December 11, 1924. Serial No. 755,265.

*To all whom it may concern:*

Be it known that I, SOL BERINGER, a citizen of the United States, and a resident of Bronxville, in the county of Westchester and State of New York, have invented a new and Improved Auto Attachment, of which the following is a full, clear, and exact description.

This invention relates to auto attachments, an object of the invention being to provide an attachment for automobiles which will prevent rearward movement of the car when in operation.

It is a well known fact that a great many accidents happen when cars are stopped by traffic or stalled on a hill, particularly in ascending the hill. In such cases drivers, and primarily those more or less inexperienced, permit the car to go backward before starting forward. This moving backward of the car bumps the car in the rear and frequently causes a number of cars to bump doing more or less damage. All drivers of automobiles are familiar with this defect in automobile construction, and it is the purpose of my invention to provide a simple attachment which may be used on any type of automobile and which when operated will absolutely prevent rearward movement of the car but will allow the same to start forwardly without obstruction, thus preventing accidents due to accidental or intentional rearward movement of the car.

With these and other objects in view, the invention consists in certain novel features of construction and combinations and arrangements of parts which will be more fully hereinafter described and pointed out in the claim.

In the accompanying drawings—

Figure 1 is a plan view illustrating my improved attachment in operative position on an automobile, only such parts of the automobile being illustrated as is necessary to point out the location and arrangement of my improvements;

Figure 2 is a view in vertical section through the front axle showing my improvements in operative position on one of the wheels;

Figure 3 is a perspective view showing the mounting of the pawl and adjacent parts;

Figure 4 is a fragmentary detail view illustrating one manner of controlling the position of the pawl.

Fig. 5 is a section taken on line 5—5 of Fig. 4.

1 represents the front axle and 2 the front wheels of an automobile. In carrying out my invention I preferably secure to both front wheels concentric with the hubs thereof, or to the hubs directly, ratchet wheels 3. These ratchet wheels may be of any desired diameter and, of course, may be secured in various ways in accordance with the construction of the particular wheel on which they are to be located.

Each ratchet wheel 3 is adapted to be engaged by a pawl 4, and I have illustrated particularly in Figure 3 one form of mounting for this pawl, which will now be described. The pawl 4 is fixed to a short shaft 5 having mounting in a bracket 6 secured to some part of the mechanism and preferably to the spindle arm 7 constituting a part of the steering mechanism. This construction may of course be varied at will to accommodate the device to any particular car construction, the only essential being that the pawl shall have a more or less fixed mounting, so that when its free end is in engagement with the teeth of the ratchet wheel it will absolutely prevent any rearward turning movement of the wheel.

The pawls 4 are normally held out of engagement with the ratchet wheels and may be operated manually from the operator's seat in any approved manner. I have illustrated, as an operating means, a small hand lever 8 which is of general bell crank form pivotally connected as shown at 9 to the steering column 10. One end of this lever 8 is connected by a flexible rod 11 with a pair of branch rods 12, and these branch rods 12 are connected to crank arms 17 on the shafts 5 which carry the pawls 4. The rod 11 and the branch rods 12 may be encased in flexible tubing as indicated at 13.

It is obvious that some means should be provided to hold the pawls out of operation as well as hold them in operation and that there must be some flexibility in the connection to allow the pawls to properly function. With this idea in view I have illustrated in Figure 4 a spring-pressed pin 14 carried by the lever 8 and adapted to ride into either of a pair of sockets or recesses 15 in a plate 16 carried by the column 10. Hence when this lever is moved to one position it will hold the pawls out of engagement with their ratchet wheels, and when moved to the other position will move the pawls into engagement with the ratchet wheels.

It is of course to be understood that ordinarily the pawls will be held out of operation with the ratchet wheels so that the car may be operated in the usual manner. When, however, the car is stopped for any reason and particularly in traffic with the car ascending an inclination, the operator moves the lever 8 to a position to allow the pawls 4 to engage the ratchet wheels 3 and prevent any rearward turning movement of the wheels of the car. Hence the car cannot move backward but it can move forward when the gears are shifted, and even though the operator may forget to shift the lever 8 the wheels can roll forwardly, the ratchet wheels riding freely under the pawls.

While I have illustrated and described a particular construction of device it is to be understood that it is my intention to cover broadly the idea of means for preventing the rearward movement of a car, this means being manually controlled by the operator of the car, and hence I do not limit myself to the details set forth but consider myself at liberty to make such slight changes and alterations as fairly fall within the spirit and scope of the appended claim.

I claim:

The combination with an automobile, ratchet wheels fixed to turn with the front wheels of the automobile, spindle arms constituting a portion of the steering mechanism of the automobile, brackets secured to the spindle arms, pawls carried by the brackets and engaging the ratchet wheels, a lever pivotally connected to the steering column, flexible devices connecting the lever and the pawls, and means for holding the lever in either of its operative positions to maintain the pawls either in or out of engagement with the ratchet wheels.

SOL BERINGER.